(12) United States Patent
Agarwal

(10) Patent No.: US 9,365,801 B2
(45) Date of Patent: Jun. 14, 2016

(54) PROCESS OF CONVERTING LOW AND HIGH FREE FATTY ACID CONTAINING OILS INTO NO FREE FATTY ACID CONTAINING OILS

(71) Applicant: Technochem International, Inc., Boone, IA (US)

(72) Inventor: Sanjeev Agarwal, Boone, IA (US)

(73) Assignee: Technochem International, Inc., Boone, IA (US)

( * ) Notice: Subject to any disclaimer, the term of this patent is extended or adjusted under 35 U.S.C. 154(b) by 0 days.

(21) Appl. No.: 13/758,408

(22) Filed: Feb. 4, 2013

(65) Prior Publication Data

US 2014/0221675 A1 Aug. 7, 2014

(51) Int. Cl.
| | | |
|---|---|---|
| C11B 3/14 | (2006.01) | |
| C11C 3/02 | (2006.01) | |
| C11C 1/02 | (2006.01) | |
| C11C 3/06 | (2006.01) | |

(52) U.S. Cl.
CPC ... *C11B 3/14* (2013.01); *C11C 1/02* (2013.01); *C11C 3/02* (2013.01); *C11C 3/06* (2013.01)

(58) Field of Classification Search
None
See application file for complete search history.

(56) References Cited

U.S. PATENT DOCUMENTS

| | | | |
|---|---|---|---|
| 2,383,596 | A | 8/1945 | Dreger |
| 2,383,601 | A | 8/1945 | Keim |
| 2,494,366 | A | 1/1950 | Sprules et al. |
| 2,808,421 | A | 10/1957 | Brokaw et al. |
| 2,875,221 | A | 3/1958 | Birnbaum |
| 3,102,129 | A | 8/1963 | Birnbaum et al. |
| 3,459,736 | A | 8/1969 | Dalibor |
| 4,164,506 | A | 8/1979 | Kawahara et al. |
| 4,267,393 | A | 5/1981 | Torck et al. |
| 4,303,590 | A | 12/1981 | Tanaka et al. |
| 4,698,186 | A | 10/1987 | Jeromin et al. |
| 4,956,286 | A | 9/1990 | Macrae |
| 5,399,731 | A | 3/1995 | Wimmer |
| 5,697,986 | A | 12/1997 | Haas |
| 5,713,965 | A | 2/1998 | Foglia et al. |
| 5,908,946 | A | 6/1999 | Stern et al. |
| 6,261,812 | B1 | 7/2001 | Yamada et al. |
| 6,399,800 | B1 | 6/2002 | Haas et al. |
| 6,423,857 | B1 | 7/2002 | Copeland et al. |
| 6,500,974 | B2 | 12/2002 | Thengumpillil et al. |
| 6,822,105 | B1 * | 11/2004 | Luxem et al. ............ 554/167 |

(Continued)

FOREIGN PATENT DOCUMENTS

| | | | | |
|---|---|---|---|---|
| GB | 1509664 | * | 5/1978 | ............ C11B 3/00 |
| WO | WO 2008120223 A2 | * | 10/2008 | ............ C11B 1/04 |

OTHER PUBLICATIONS

Azhair, M. et al., Reductin of free fatty acids in crude Jatropha Curcas oil, via an esterificatin process, 2008, International Journal of Engineering and Technology, vol. 5, No. 2, pp. 92-98.*

(Continued)

*Primary Examiner* — Yate K Cutliff

(57) ABSTRACT

A system and method for the conversion of high free fatty acid (HFFA) containing oils defined as oils containing 20-100% free fatty acids (FFA) and low free fatty acid (LFFA) containing oils defined as oils containing 1-20% free fatty acids (FFA) into oil with less than 0.5% FFA (defined as NFFA oil) includes a combination of partial glycerolysis of HFFA oils to produce LFFA oils and subsequent stripping of LFFA oils to produce NFFA oils via steam distillation.

13 Claims, 5 Drawing Sheets

(56) References Cited

U.S. PATENT DOCUMENTS

| | | | |
|---|---|---|---|
| 7,619,104 | B2 | 11/2009 | Clements |
| 7,806,945 | B2 * | 10/2010 | Jackam et al. .................. 44/308 |
| 7,871,448 | B2 | 1/2011 | Jackam et al. |
| 8,088,183 | B2 | 1/2012 | Jackam et al. |
| 2003/0083514 | A1 | 5/2003 | Boocock |
| 2011/0054200 | A1 * | 3/2011 | Cai et al. ....................... 554/169 |
| 2012/0123140 | A1 | 5/2012 | Jackam et al. |
| 2013/0012734 | A1 * | 1/2013 | Fukuhara et al. ............. 554/204 |

OTHER PUBLICATIONS

Felizardo, P., et al., Study on the glycerolysis reactin of high free fatty acid oils for use as biodiesel feedstock, 2011, Fuel Processing Technology, No. 92, pp. 1225-1229.*

Canakci et al, "Biodielsel Production from Oils and Fats with High Free Fatty Acids", "Transactions of the American Society of Agricultural Engineers", pp. 1429-1436, vol. 44, No. 6.

Davis Clements, "Pretreatment of High Free Fatty Acid Feedstocks", "Biodiesel Production Technology Workshop III", Mar. 26, 2003, pp. 78c-78i.

Felizardo et al, "Study on the Glycerolysis Reaction of High Free Fatty Acid Oils for Use as Biodiesel Feedstock", "Fuel Porcessing Technology", Jun. 1, 2011, pp. 1225-1229, vol. 92, No. 6.

Kumoro, "Experimental and Modeling Studies od the Reaction Kinetics of Alkaline-Catalyzed used Frying Oil Glycerolysis Using Isopropyl Alcohol as a Reaction Solvent", "Research Journal of Applied Sciences, Engineering and Technology", pp. 869-876, vol. 4, No. 8.

Nioureddini et al., "Glycerolysis of Fats and Methyl Etsers", "Journal of the American Oil Chemists' Society", pp. 419-425, vol. 74, No. 4.

Sonntag, "Flycerolysis of Fats and Methyl Esters—Status, Review, and Critiquie", "Journal of American Oil Themists' Society", pp. 795A-802A, vol. 59.

Tyson, "Biodiesel Technolgy and Feedstocks", "National Renewable Energy Laboratory", pp. 1-37.

K. Shaine Tyson, "Brown Grease Feedstocks for Biodiesel", "National Renewable Energy Laboratory", pp. 1-33.

Chihata, "Koteika Kosa (Immobolized Enzyme)", Kodansha Ltd. Publishers, pp. 9-85.

Chihata, "Koteika Seitai-shokubai (Immobolized Biocatalyst)", Kodansha Ltd. Publishers, pp. 12-101.

Gerpen et al, "Biodiesel Production Technology", "National Renewable Energy Laboratory", Jul. 1, 2004.

* cited by examiner

PROCESS OF CONVERTING LOW AND HIGH FREE FATTY ACID CONTAINING OILS INTO NO FREE FATTY ACID CONTAINING OILS

FIELD OF THE INVENTION

The present invention relates generally to oils for use as biodiesel feedstock and, more particularly, to improved processes and systems for refining low free fatty acid oils and high free fatty acid oils for use as biodiesel feedstock.

BACKGROUND OF THE INVENTION

Biodiesel, defined as fatty-acid alkyl ester (FAAE), is most commonly produced by a process of trans-esterification of triglycerides. The process involves reacting oils and fats with alcohol, usually methyl alcohol, in the presence of an alkaline catalyst. The conversion of triglycerides with alkaline catalysis is described in U.S. Pat. Nos. 2,383,601 and 2,494,366. The process is most efficient when the feedstock is a pure glyceride (refined oils and fats). The problem is that the price of the glycerides has increased dramatically over the last several years rendering it impossible to produce biodiesel that can compete with petrodiesel. Unfortunately, while cheaper feedstocks are available, they contain impurities including free fatty acids (FFA) that require additional processing, thus increasing the cost of producing biodiesel. The challenge is to develop processes that can allow production of cheaper feedstocks for producing biodiesel.

The literature includes a number of approaches of dealing with FFA (see, Brown Grease Feedstocks for Biodiesel (2002) WWW domain nrel.gov, 2002, pp. 1-33, National Renewable Energy Laboratory, Boulder, Colo.). One of the options is to strip the FFAs from the oil. This is a well-known process, also known as physical refining or steam distillation. In this process, the FFA is stripped (evaporated) from the oil under vacuum. The FFA is condensed and recovered. The advantage of this process is that it produces oil that is practically free of FFAs and a very good feedstock for producing biodiesel. A challenge with this process is that there is a reduction in the amount of oil available to produce biodiesel due to loss of FFA and some neutral oil during the stripping process. Consequently, the higher the FFA the higher the yield loss and the lower the attractiveness of this approach. An example of this process of recovering fatty acids is set out in U.S. Pat. No. 6,423,857. This patent focuses on pre-treating high phospholipid containing oil (such as soybean oil) prior to steam distillation and subjecting the oil to steam distillation that produces a distillate containing at least about 97 percent by weight free fatty acids.

Another option is to react the FFAs with an alcohol, usually methyl alcohol, in the presence of an acid catalyst to produce FAAE. For instance, U.S. Pat. No. 4,164,506 discloses a biodiesel synthesis wherein fatty acids are subjected to acid catalysis. This process is called acid esterification and would be very attractive if it could convert all FFA into FAAEs. Unfortunately, this process poses several challenges: (a) unreacted or unconverted FFA left in the oil after esterification must be removed with additional intermediate steps and equipment; (b) the esterification process requires use of acidic catalyst which poses risk to people (risk of burning skin and flesh upon contact) as well as equipment (risk of corrosion upon contact); and (c) the esterification process requires a large quantity of excess methanol (needed to maintain the proper equilibrium for advancing the reaction which is inhibited by the formation of water during esterification) thus increasing the emission of volatile substance in the atmosphere. The acid esterification is especially unattractive when the FFA content is higher because a large amount of acid catalyst and methyl alcohol are required in order to convert feedstocks having high FFA content. Since the acid catalyst must be neutralized with alkali before processing the glycerides, the increased catalyst loading results in an excessive amount of salts produced as a consequence of alkali neutralization. Further, such processes generate a large volume of waste water as revealed in the disclosures of U.S. Pat. Nos. 4,303,590, 5,399,731 and 6,399,800.

Alternatively, solid catalysts can be used for the acid esterification reaction to avoid a neutralization step before the transesterification reaction. These processes have been extensively explored and documented, such as in U.S. Pat. No. 3,459,736 (which uses titanium oxide as a catalyst), U.S. Pat. No. 4,698,186 (which utilizes various solid catalysts), U.S. Pat. No. 4,267,393 which uses sulfonated resins as solid acid catalysts and U.S. Pat. No. 5,908,946 which employs zinc and aluminum oxide as catalysts for the esterification reaction).

U.S. Pat. Appl. No. 2003/0083514 discloses a single-phase process for production of fatty acid methyl esters from mixtures of triglycerides and fatty acids. This process is limited in that it requires acid catalyzed esterification of fatty acids prior to the transesterification step. U.S. Pat. No. 2,383,596 discloses a method for esterifying fatty acid and trans-esterifying glycerides. This process is limited in that only an esterification step is disclosed.

A third option is enzymatic catalysis. The conversion of both free fatty acids and triglycerides with enzyme catalysis is disclosed in U.S. Pat. Nos. 4,956,286, 5,697,986 and 5,713,965. A representative example of the esterification or trans-esterification method is disclosed in JP-B 6-65311, in which fatty acids or lower alcohol esters thereof are reacted with glycerol in the presence of an immobilized lipase having 1,3-position selectivity and the byproduct water or lower alcohol formed by the reaction is removed from the system at a reduced pressure to obtain the diglycerides. This reaction is preferably conducted in the presence of an enzyme having an ester activity, such as a lipase or an esterase, preferably in the presence of an immobilized or intracellular lipase having 1,3-position selectivity. Known methods for immobilization are described, for example, In "Koteika Koso (Immobilized Enzyme)," edited by Ichiro Chihata, published by Kodansha Ltd. Publishers, pp. 9-85 and "Koteika Seitai-shokubai (Immobilized Biocatalyst)" edited by Ichiro Chihata, published by Kodansha Ltd. Publishers, pp 12-101. Immobilization onto an ion-exchange resin is preferred. Lipases having 1,3-position selectivity and usable in immobilization include those derived from microorganisms of, for example, the genera *Rhizopus, Aspergillus, Mucor*, etc., as well as pancreatic lipases, and the like. For example, use can be made of the lipases derived from *Rhizopus delemar, Rhizopus japonicus, Rhizopus niveus, Aspergillus niger, Mucor javanicus*, and *Mucor miehei*. A commercial immobilized lipase having 1,3-position selectivity is Lipozyme® IM, manufactured by Novo-Nordisk Bioindustry A.S. An intracellular lipase having 1,3-position selectivity comprises a lipase having 1,3-position selectivity adsorbed or bonded to microbial cells. A commercially available example thereof is Olipase™, manufactured by Nagase & Co., Ltd. This process is challenging because the reaction produces water which inhibits the forward reaction. Other problems with enzymatic processing are the slow reaction rates and high cost of enzymatic catalysts. Further, enzymatic catalysts have a limited life. These shortcomings when compared to alkaline and acidic reactions render the enzymatic processes economically unfavorable.

A fourth option is described in US Pat. Appl. No. 2012/0123140 involving glycerolysis of high free fatty acid (HFFA) oil. This process converts FFAs into oils through esterification of fatty acids with glycerol. The resulting product is oils which are fatty acid glycerin esters (or FAGE). This process is variously known as glycerolysis, alcoholysis, or esterification. Glycerolysis of fats and oils with glycerol has been intensively researched during the 1940's and 1950's. Sonntag (1982) (Sonntag, N. O. V., glycerolysis of Fats and Methyl Esters—Status, Review, and Critique, Journal of American Oil Chemists Society 59:795A-802A) has a complete collection of these patents in his review. The reaction produces a mixture of mono-, di- and tri-glycerides.

For example, U.S. Pat. No. 3,102,129 discloses a process for producing monoglycerides of fatty acids and U.S. Pat. No. 2,875,221 discloses a process for preparing monoglycerides of fatty acids. These processes are limited in that they require admixing a substantial proportion of previously reacted monoglyceride product with a freshly mixed stream of glycerol and fat and rapidly heating the mixture on a hot surface. U.S. Pat. No. 6,500,974 discloses a process for preparation of a monoglyceride. This process is limited in that the presence of a food grade polar solvent is required in the glycerolysis reactor.

Although the esterification or transesterification method is a process in which fatty acids or lower alcohol esters thereof and glycerol are converted to partial diglycerides through a one-step reaction, it is not cost efficient because the individual feedstock materials are expensive. For conducting the second stage esterification reaction, glycerol is added to the partial decomposition product, obtained through the first-stage reaction in such an amount that the mole number of fatty acid groups in the decomposition product mixture of the first stage is from 0.8 to 2.5 mol per 1 mol of glycerol groups based on the total of glycerol groups of the decomposition product mixture of the first stage and glycerol groups added to the second stage (see, e.g., U.S. Pat. No. 6,261,812).

On the other hand, U.S. Pat. No. 2,808,421 discloses a method for preparing mixed triglyceride compositions using a titanium alcoholate catalyst. U.S. Pat. Nos. 7,806,945, 8,088,183, 7,871,448, and US. Pat. Appl. No. 2012/0123140, disclose a process for preparation of fatty acid methyl ester using HFFA oil. The process includes glycerolysis as part of their overall process. The conditions taught for glycerolysis of free fatty acids (at a temperature of about 220° C. and at a pressure of about 2 pounds per square inch absolute) in a glycerolysis reaction without a catalyst to produce a glycerolysis reactor effluent stream that contains less than 0.5 percent by weight of free fatty acids and a plurality of glycerides, are similar to other literature. These patents teach there is a need for at least two continuous stirred tank reactors that are operated in series with a combined residence time of not more than about 500 minutes. For a 20% FFA stream, the time taken is no more than 200 minutes. A problem with this approach is that, despite claims to the contrary, it only efficiently reduces the FFA by 80-90%, thus making it necessary to either use catalysts or add intermediate steps and equipment to reduce the remaining FFA either chemically or physically. Moreover, the size of glycerolysis reactors is large because it is sized to handle the entire mass of oil even though the FFA content is a relatively small portion of that stream and consequently there is a waste of energy because a greater amount of material (the entire HFFA oil stream) is subject to higher temperature and then cooled down when it is only necessary to heat the FFA.

The background art is also characterized by a number of non-patent publications. Noureddini et al. in *glycerolysis of Fats and Methyl Esters*, JAOCS, 1997, pp. 419-425, vol. 74, no. 4 discloses the glycerolysis of methyl esters and triglycerides with crude glycerin. The main focus of their study is on utilization of "crude" glycerol obtained from the biodiesel industry as opposed to "pure" glycerin previously used in glycerolysis to mono-, di-, and tri-glycerides. They did not disclose glycerolysis of fatty acids and their focus was on production of mono- and di-glycerides from FAME and tri-glycerides using crude glycerin.

Felizardo, et al. in "Study on the glycerolysis reaction of High Free Fatty Acid Oils for Use as Biodiesel Feedstock", Fuel Processing Technology, 2011, pp 1225-1229, vol 92, no. 6, discloses the conversion of oils with a high content of FFA (20-50%) by esterification with glycerol. The results suggest that the FFA content could be reduced from 50% to 5% in 3 hours at 200° C. without the use of a catalyst. The presence of a zinc-based catalyst reduced the reaction time to 1 hour and reduced the FFA to 1.2%.

Canakci, M. and J. Van Gerpen (2001) in Biodiesel Production from Oils and Fats with High Free Fatty Acids, Transactions of the American Society of Agricultural Engineers, 44(6):1429-1436 discloses that "glycerolysis" is an alternative process that can be used with feedstocks containing more than 10% FFAs. This involves adding glycerin at 400° F. and letting it react with the FFAs to form monoglycerides, a glycerol molecule to which one free fatty acid has been joined. These monoglycerides can then be processed using a standard alkaline catalyst transesterification process. Waste glycerin from biodiesel processing can be used in this process. Glycerolysis can be expensive because of the high heat involved, which requires a high-pressure boiler and trained boiler operator. Also, a vacuum must be applied while heating to remove water that is formed during the reaction. Another disadvantage is that the glycerin will also react with the triglycerides in the oil to convert some of them to monoglycerides. While this does not negatively impact the reaction, it means that more glycerin is required for the process, and therefore more glycerin must be removed at the end of the transesterification.

Kumoro in "Experimental and Modeling Studies of the Reaction Kinetics of Alkaline-Catalyzed used Frying Oil Glycerolysis using Isopropyl Alcohol as a Reaction Solvent, Research Journal of Applied Sciences, Engineering and Technology 4(8): 869-876, 2012, discloses a glycerolysis process using isopropyl alcohol and an alkaline catalyst. However, the focus of this and several other research is to convert triglycerides to mono-glycerides for use in foods, cosmetics, and pharmaceutical products. This study is not directly relevant to our invention because it does not address glycerolysis of fatty acids.

Tyson in Brown Grease Feedstocks for Biodiesel, WWW domain nrel.gov, 2002, pp. 1-33, National Renewable Energy Laboratory, Boulder, Colo., discloses techniques for converting greases to biodiesel. The techniques disclosed in this reference are limited. Moreover, the conditions taught for glycerolysis of free fatty acids are at temperatures in the range of 250° C. to 260° C. in the absence of a catalyst or at 220° C. with a catalyst. The reference teaches that there is "no proven technology for 50+% FFA mixes" and that "combined processes for ASTM [American Standard for Testing and Materials] quality biodiesel not well developed, technical and economic questions exist."

Tyson in Biodiesel Technology and Feedstocks, WWW domain nrel.gov, 2003, pp. 1-37, National Renewable Energy Laboratory, Boulder, Colo., includes much of the same information as contained in her 2002 presentation. The reference notes that using "glycerolysis to treat FFA" to "convert FFA to monoglycerides, then transesterify" is "commercial, not currently used in biodiesel."

Davis Clements in Pretreatment of High Free Fatty Acid Feedstocks, Biodiesel Production Technology Workshop III, Mar. 26-28, 2003, pp. 78c-78i, University of Nebraska, Lincoln, Nebr., discloses a number of methods for pretreatment of high free fatty acid feedstocks prior to transesterification. This process is limited in that glycerolysis is carried out at 200° C. under an 11 pounds per square inch vacuum, usually with a catalyst such as zinc chloride, with venting of water. This process is further limited in that, in the absence of a catalyst, a residence time of over 5 hours is required to achieve an effluent containing less than 1 percent free fatty acids.

SUMMARY OF THE INVENTION

We have listed the prior art and their merits and problems. Moreover, the goals of many prior art works pertaining to glycerolysis have been different. One stream of research has addressed the conversion of tri-glycerides to mono-glycerides for the purpose of producing emulsifiers used in foods, cosmetics, and pharmaceutical products. On the other hand, the goal of converting fatty acids to glycerides is more relevant to the present invention. However, the attempt of the prior art has been to obtain close to full conversion of fatty-acids to glycerides. The goal of the present invention in the glycerin-esterification step is not to achieve full conversion of FFA into glycerides but rather to achieve about 80-95% conversion of FFA into glycerides. This can be achieved without the use of any catalyst and with less energy input. The glycerolysis is then coupled with FFA stripping to remove the remaining FFA to produce oil containing less than 0.5% FFA. This combination of glycerin-esterification and subsequent stripping results in greater consistency of the final product.

Moreover, this combination process allows the flexibility to process different types of Low Free Fatty Acid (LFFA) and High Free Fatty Acid (HFFA) oils in different ways. Specifically, the present invention processes LFFA (containing 1-20% FFA) oil by stripping. The recovered FFA is then treated with glycerol to convert into glycerides. The glyceride stream will contain 1-10% FFA that is returned to the front of the stripping process to remove the remaining FFA. This forms a closed loop wherein none of the FFA is wasted. The HFFA oil (containing 20-100% FFA) is treated with glycerol to convert into glycerides. The resulting glyceride stream will contain 1-20% FFA that will be subject to stripping process to remove the remaining FFA. The recovered FFA will be added to the front of the glycerin-esterification process to convert into glycerides. This forms a closed loop wherein none of the FFA is wasted.

The present invention is a novel process for the conversion of oil containing up to 100% FFA to an oil containing less than 0.5% FFA. Through this novel combination of process steps, these low-grade fatty materials that previously could not be utilized by existing processes are easily refined to biodiesel-ready feedstock by means of the invention disclosed herein. Since the cheapest feedstocks are the ones that have the highest FFA content, there is a need for a process that does not entail the shortcomings of existing processes described above. Such processes also need to reduce waste and energy consumption while increase yield. Further, the present invention combines several unit operations into an economical and unique process for the conversion of low and high free fatty acid oils to no free fatty acid oils without the loss of FFAs. The invention allows biodiesel producers to use a no free fatty acid (NFFA) feedstock.

BRIEF DESCRIPTION OF THE DRAWINGS

The features of the invention will be better understood by reference to the accompanying drawings which illustrate presently preferred embodiments of the invention. In the drawings.

DESCRIPTION OF THE PREFERRED EMBODIMENTS

Example 1

LFFA Oil (i.e., Oil Containing 2-20% FFA)

Step-1

Figure 1:
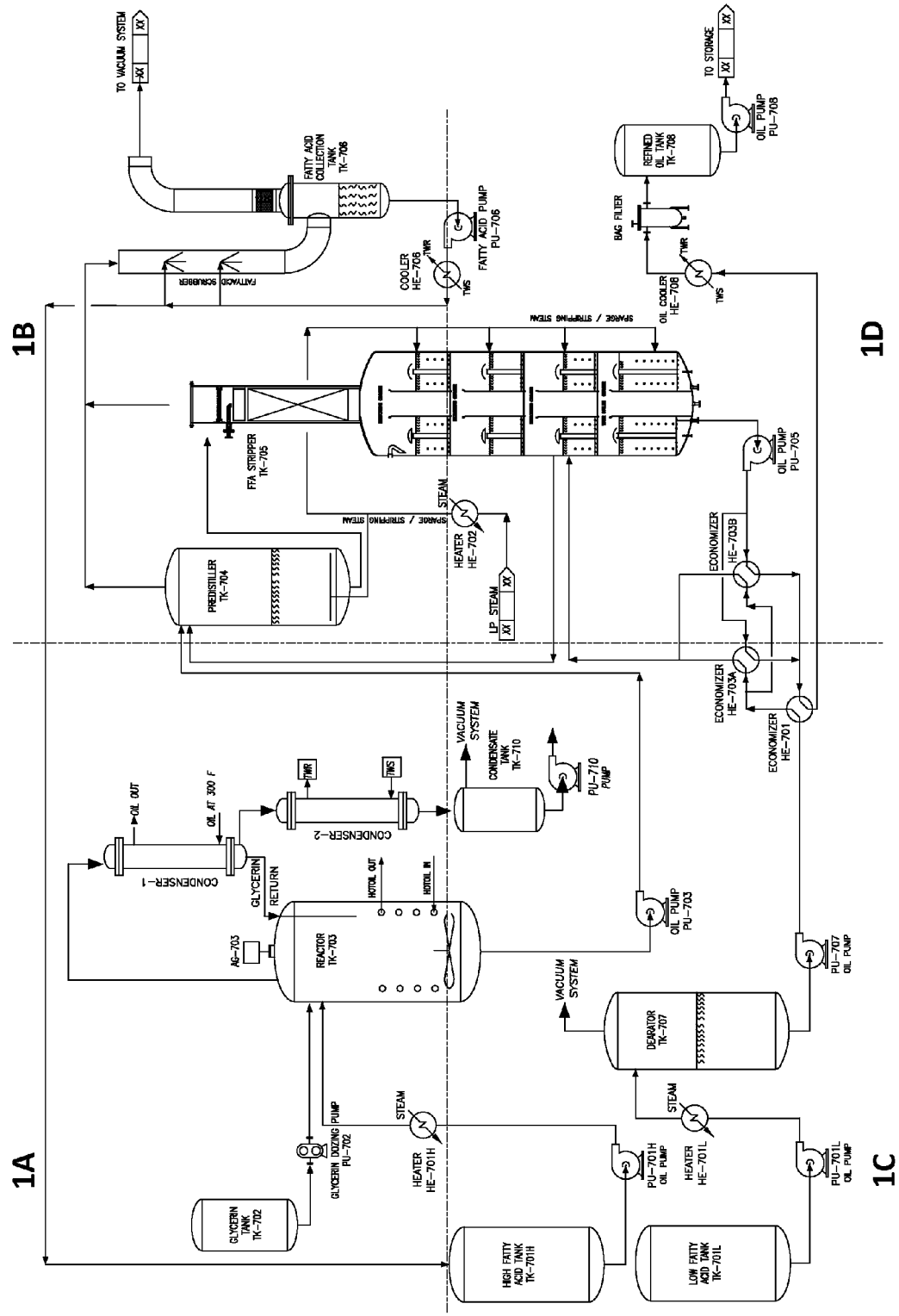
FIG. 1 is a schematic flow diagram of the process of glycerin esterification and FFA stripping, according to an exemplary embodiment.
Figure 1A:
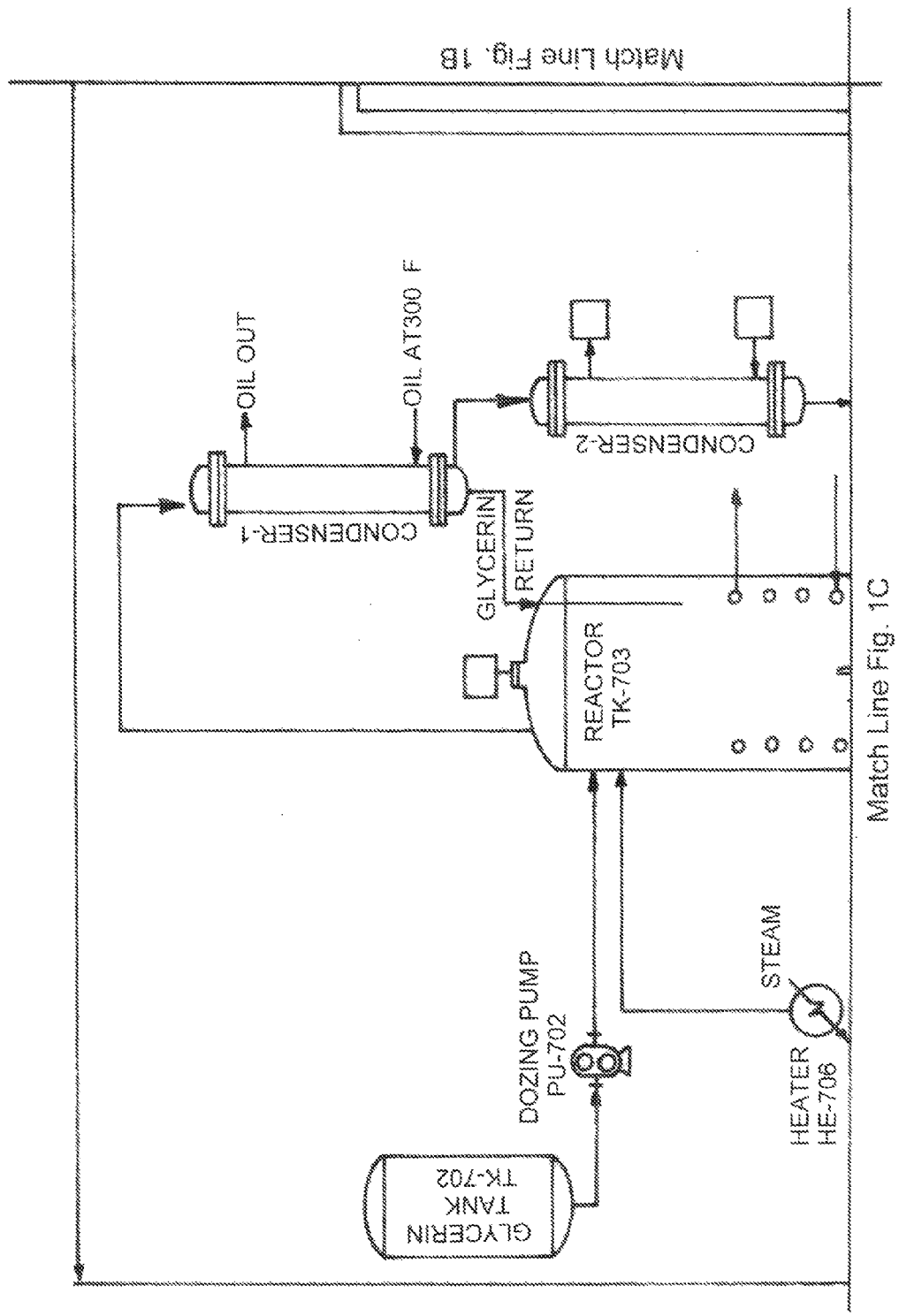
FIG. 1A is an expanded, detailed view of the upper left quarter of FIG. 1.
Figure 1B:
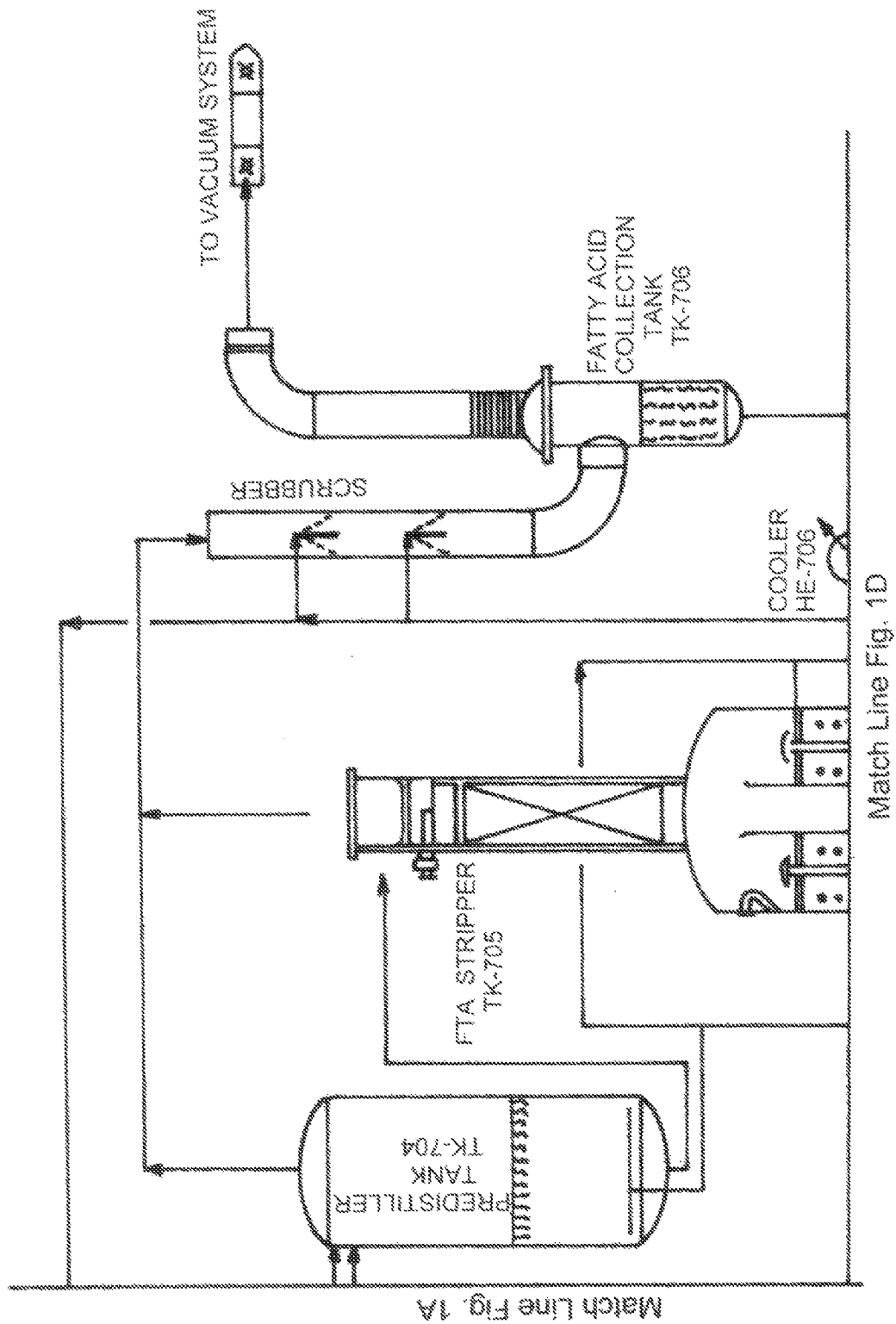
FIG. 1B is an expanded, detailed view of the upper right quarter of FIG. 1.
Figure 1C:
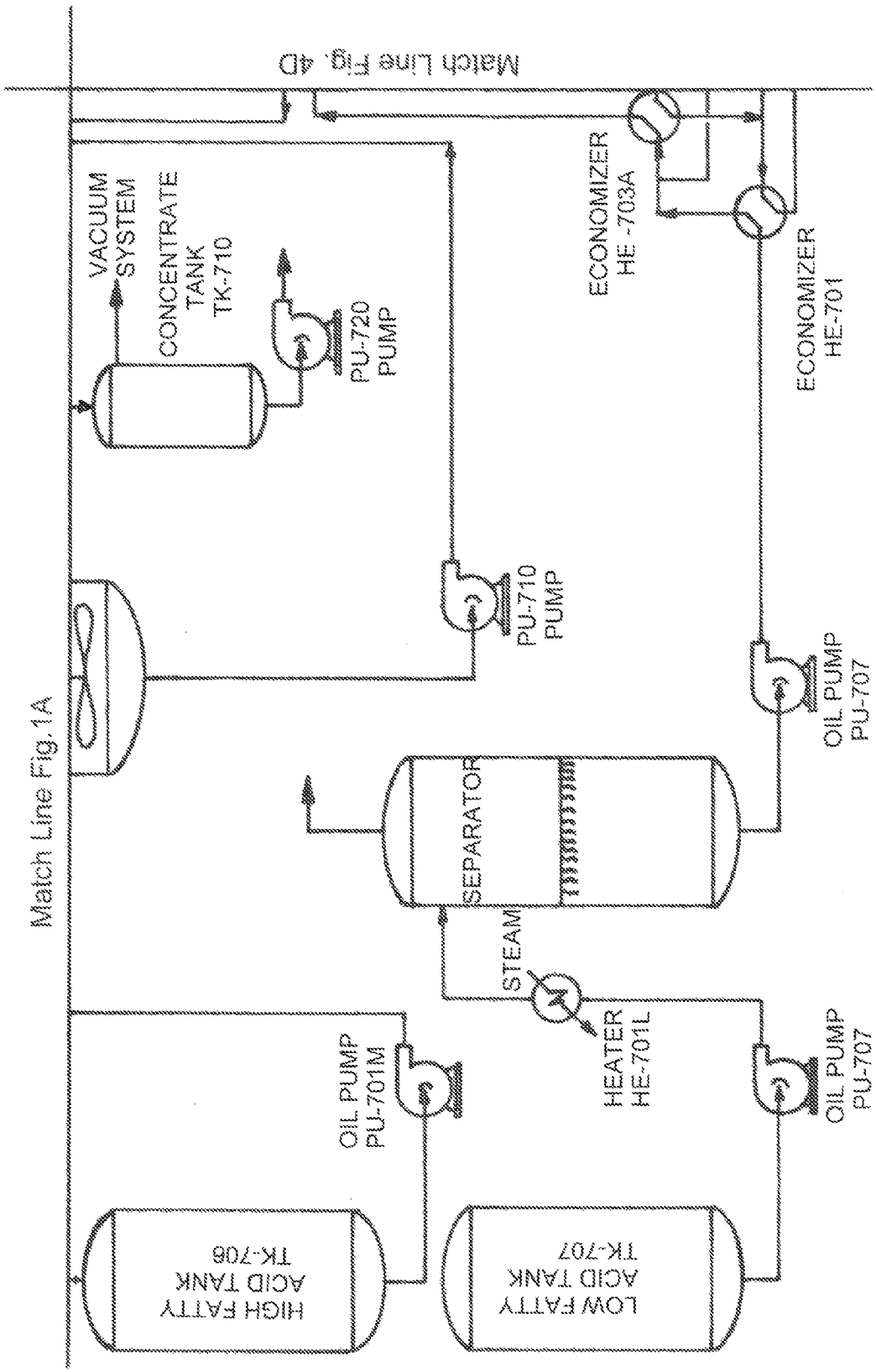
FIG. 1C is an expanded, detailed view of the lower left quarter of FIG. 1.
Figure 1D:
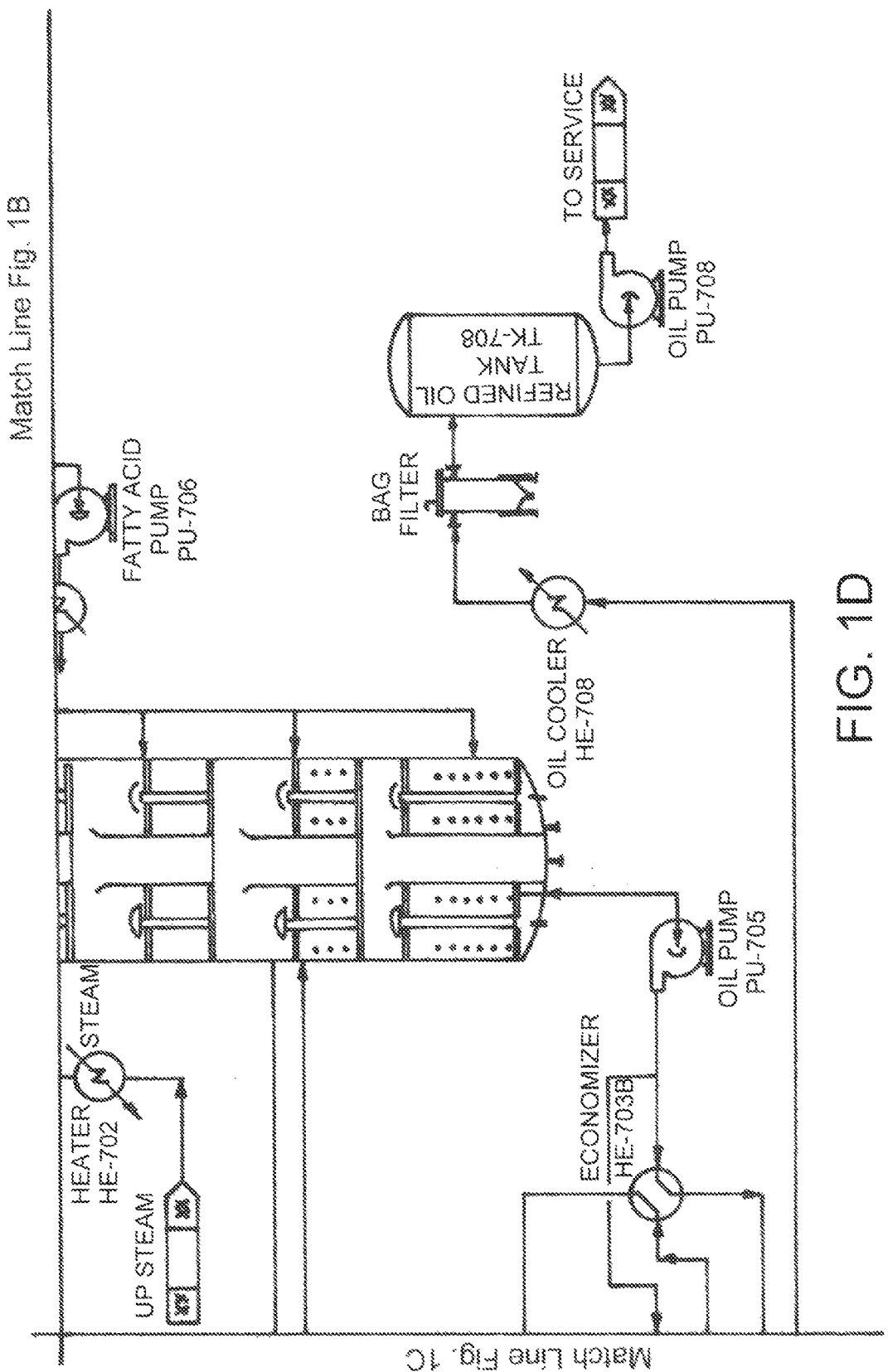
FIG. 1D is an expanded, detailed view of the lower right quarter of FIG. 1.

The process of the invention includes a FFA stripping step wherein low free fatty acid (LFFA) oil (1-20% FFA by wt %) is first stripped of FFA. With reference to FIGS. 1A-D, the oil is pumped by PU-701L through a start-up heater HE-701L to a deareator TK-707. The purpose of the deareator is to remove any air or moisture contained in the feedstock. The deaerator operates at temperature of 70° C.-120° C. (preferred between 80-100° C.) and pressure of 25-200 mm Hg absolute depending upon the moisture content (preferred between 50-75 mm).

The deaerated-oil is pumped by pump PU-707 through economizer HE-701 and heater HE-703A/703B into a pre-distiller TK-704. The temperature is raised to between 180° C.-300° C. (preferred between 230-280° C.) at a pressure of 1-10 mm Hg absolute (preferred between 3-5 mm).

A majority of the FFA flashes off in the pre-distiller. The remaining oil flows over to FFA stripper TK-705 where the remaining FFA is stripped by injecting steam at the various levels in the column. The steam strips FFA and carries it with it into a fatty acid scrubber where the FFA is condensed. Cooled FFA is used to scrub the FFA from steam vapors. The liquid FFA is collected in the fatty acid collection tank TK-706. The collected FFA is pumped with pump PU-706 through a cooler HE-706 into the fatty acid scrubber. The stream from the bottom of the stripper TK-705 is pumped with pump PU-705. Since the oil is at very high temperature, heat is recovered in economizers HE-704A/704B and HE-701 to heat the incoming oil. The finished product is refined oil with less than 1% (preferred below 0.2%) FFA. The refined oil is cooled in cooler HE-708 and polished in the bag filter before being sent to storage. The recovered fatty acids are collected in tank TK-706 and pumped back to the feedstock storage tank TK-701H for feeding to the glycerin esterification in Step-1.

Step-2

The process of the invention further consists of a glycerin-esterification step wherein the HFFA oil produced in Step-1 is pumped with pump PU-701H. The HFFA oil is pumped through a start-up heater HE-701H to reactor TK-703. The reaction temperature is between 160° C. to 300° C. (preferred between 200-260° C.) at a pressure of 10 mm to 150 mm Hg absolute (preferred between 50-75 mm). Technical-grade glycerol is pumped from tank TK-702 into the reactor TK-703 with dozing pump PU-702. The fatty-acid contained in HFFA oil reacts with glycerol and converts to oil. Byproduct of the reaction is water. The water is continuously removed from the reactor due to heat and vacuum. Any glycerol that is vaporized and carried along with water is condensed in condenser-1 at a controlled temperature so only glycerol is condensed. The water vapors are allowed to pass on to condenser-2 where it is condensed. The water is collected in condensate tank TK-710 and discharged with pump PU-710. TK-710 is connected to a vacuum pump. The reaction presented above may be accomplished in multiple stage reactors in a continuous operation.

The finished product is LFFA oil and is transferred with pump PU-703 to the FFA stripping step (Step 1) to completely remove FFA to less than 1.0%.

Example 2

Oil Containing 20-100% FFA

Step-1

The process of the invention consists of a glycerin-esterification step wherein the high free fatty acid (HFFA) containing oil (20-100% FFA) is pumped from tank TK-701H with pump PU-701H. The HFFA oil is pumped through a start-up heater HE-701H to reactor TK-703. The reaction temperature is between 160° C. to 300° C. (preferred between 200-260° C.) at a pressure of 10 mm to 150 mm Hg absolute (preferred between 30-75 mm Hg absolute).

Technical-grade glycerol is pumped from tank TK-702 into the reactor TK-703 with dozing pump PU-702. The fatty-acid contained in HFFA oil reacts with glycerol and converts to oil. A byproduct of the reaction is water. The water is continuously removed from the reactor due to heat and vacuum. Any glycerol that is vaporized and carried along with water is condensed in condenser-1 at a controlled temperature so only glycerol is condensed. The water vapors are allowed to pass on to condenser-2 where it is condensed. The water is collected in condensate tank TK-710 and discharged with pump PU-710. TK-710 is connected to a vacuum pump.

The reaction presented above may be accomplished in multiple stage reactors in a continuous operation. The finished product is LFFA oil and is transferred with pump PU-703 to the FFA stripping step (Step-2 below) to completely remove FFA to less than 1.0%.

Step-2

The process of the invention further consists of an FFA stripping step wherein glycerin-esterified oil from Step-1 is stripped of FFA. The LFFA oil is pumped with pump PU-703 to a pre-distiller TK-704. The temperature is raised to between 180° C.-300° C. (preferred between 230-280° C.) at a pressure of 1-10 mm Hg absolute (preferred between 3-5 mm Hg absolute).

A majority of the FFA flashes off in this vessel. The oil flows over to FFA stripper TK-705 where the remaining FFA is stripped by injecting steam at the various levels in the column. The steam strips FFA and carries it with it into the fatty acid scrubber where the FFA is condensed. Cooled FFA is used to scrub the FFA from steam vapors. The liquid FFA is collected in the fatty acid collection tank TK-706. The collected FFA is pumped with pump PU-706 through a cooler HE-706 into the fatty acid scrubber. The stream from the bottom of the stripper TK-705 is pumped with pump PU-705. Since the oil is at very high temperature, heat is recovered in economizers HE-704A/704B to heat the incoming oil. The finished product is refined oil with less than 1.0% FFA. The refined oil is cooled in cooler HE-708 and polished in the bag filter before being sent to storage. The recovered fatty acids are collected in tank TK-706 and pumped back to the feed-stock storage TK-701H for feeding to the glycerin esterification in Step-1.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is as follows:

1. A process for the production of oil having less than 1.0% free fatty acids from oil containing between 1-20% free fatty acids, comprising the steps of:
   (a) purifying a stream of the 1-20% free fatty acid containing oil by steam distillation at high temperature and low pressure, wherein steam is used to strip the free fatty acids;
   (b) recovering stripped fatty-acids through condensation;
   (c) reacting the recovered free fatty acids with glycerin at high temperature and low pressure to produce oil with 0.2-20% free fatty acids; and
   (d) stripping the free fatty acids from the glycerin-esterified oil by steam distillation.

2. A process for the production of oil having less than 1.0% free fatty acids from oil containing between 20-100% free fatty acids, comprising the steps of:
   (a) reacting the 20-100% free fatty acids oil with glycerin in the absence of a catalyst at high temperature and low pressure to produce a stream of oil having between 0.2-20% free fatty acids;
   (b) purifying the resultant stream by steam distillation at high temperature and low pressure, wherein steam is used to strip the remaining free fatty acids;
   (c) recovering the stripped free fatty acids through condensation; and
   (d) feeding the recovered free fatty acids back to step (a).

3. The process of claim 2, wherein 70-100% of the free fatty acids contained in the oil containing between 20-100% free fatty acids are converted to oil in step (a).

4. The process of claim 3, wherein the oil is prepared by mixing the oil and glycerin at an elevated temperature and reduced pressure.

5. The process of claim 2, wherein step (c) comprises taking the output of step (a) and stripping the remaining free fatty acids to produce oil having less than 1.0% free fatty acids.

6. The process of claim 5, wherein the oil having less than 1.0% free fatty acids is prepared by stripping the free fatty acids from the oil by injecting steam at an elevated temperature and reduced pressure.

7. The process of claim 2, wherein step (d) comprises mixing the stripped free fatty acids with the oil having between 20-100% free fatty acids in step (a) to reprocess the recovered free fatty acids.

8. The process of claim 1, wherein step (a) comprises stripping the free fatty acids to produce an oil having less than 1.0% free fatty acids.

9. The process of claim 8, wherein the oil having less than 1.0% free fatty acids is prepared by stripping the free fatty acids from the oil by injecting steam at an elevated temperature and reduced pressure.

10. The process of claim 1, wherein step (b) comprises recovering the free fatty acids from the stripping process.

11. The process of claim 1, wherein 70-100% of the free fatty acids contained in the recovered free fatty acids is converted to an oil in step (c).

12. The process of claim 11, wherein the oil is prepared by mixing the oil and glycerin at an elevated temperature and reduced pressure.

13. The process of claim 1, wherein the glycerin-esterified oil from step (c) is mixed with the oil having free fatty acids feeding into step (a).

\* \* \* \* \*